(No Model.)

A. L. BRICE.
CLIP FOR BICYCLE PEDALS.

No. 605,536. Patented June 14, 1898.

Witnesses.
C. F. Kilgore
R. F. Merchant

Inventor
Alfred L. Brice
By his Attorney
Jas. F. Williams

THE NORRIS PETERS CO., PHOTO-LITHO., WASHINGTON, D. C.

UNITED STATES PATENT OFFICE.

ALFRED L. BRICE, OF MINNEAPOLIS, MINNESOTA.

CLIP FOR BICYCLE-PEDALS.

SPECIFICATION forming part of Letters Patent No. 605,536, dated June 14, 1898.

Application filed July 25, 1896. Serial No. 600,472. (No model.)

*To all whom it may concern:*

Be it known that I, ALFRED L. BRICE, a citizen of the United States, residing at Minneapolis, in the county of Hennepin and State of Minnesota, have invented certain new and useful Improvements in Clips for Bicycle-Pedals; and I do hereby declare the following to be a full, clear, and exact description of the invention, such as will enable others skilled in the art to which it appertains to make and use the same.

My invention has for its object to provide an improved clip for use on the pedals of bicycles or other articles.

To this end my invention consists of the novel devices and combinations of devices hereinafter described, and defined in the claims.

The invention is illustrated in the accompanying drawings, wherein like letters and figures refer to like parts throughout the several views.

Figure 1:
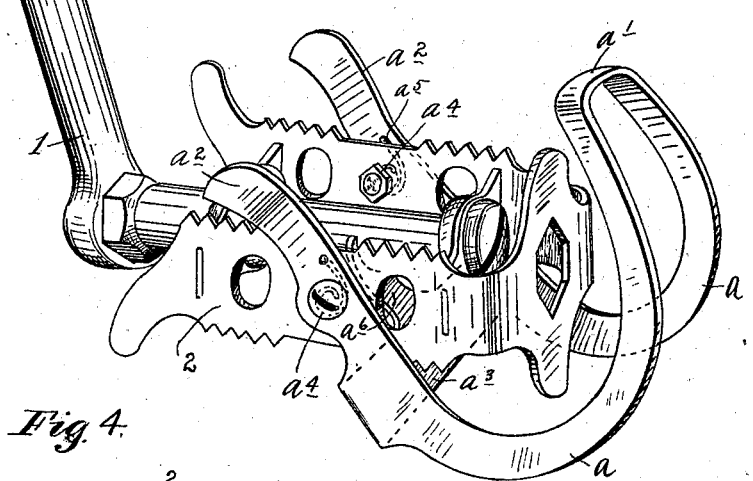
Figure 4:
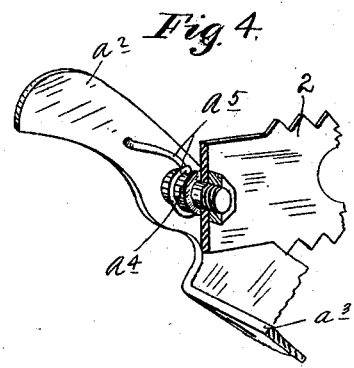
Figure 2:
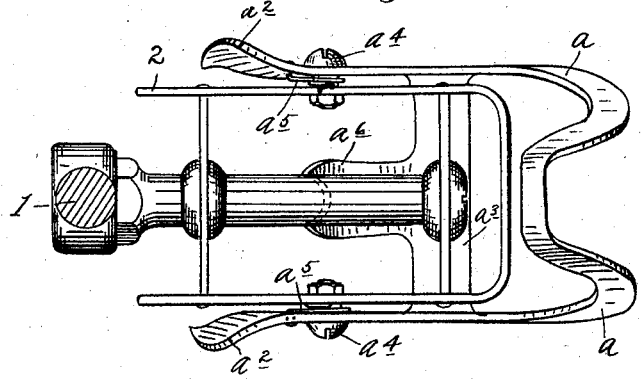
Figure 3:
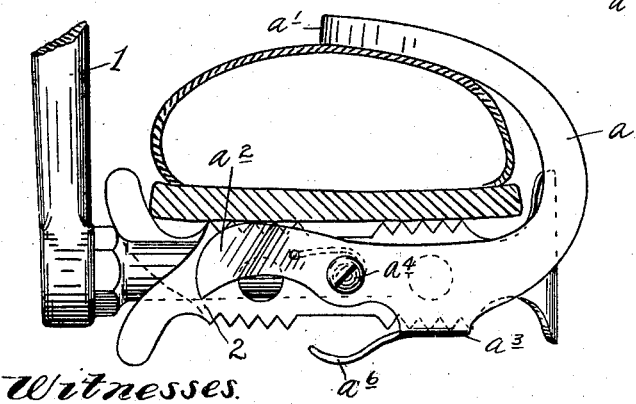

Figure 1 is a perspective view showing the preferred form of my invention as applied to a bicycle-pedal, with some parts broken away. Fig. 2 is a plan view of the parts shown in Fig. 1. Fig. 3 is a rear elevation of the parts shown in Fig. 1 as the same would appear when the foot of the rider was in working position on the pedal, with some parts shown in section. Fig. 4 is a detail for showing the application of the spring or springs to the clip.

The numerals 1 and 2 represent, respectively, the crank-arm and the pedal of an ordinary bicycle. It is of course well understood that the pedal 2 is free to rotate on the handle or pin of the crank-arm 1. To the pedal 2 I secure my improved clip $a$ $a'$ $a^2$ $a^3$, by means of pivots $a^4$, at right angles to the axis of the pedal. All the parts of the said clip may be stamped up from a sheet of steel or other metal or be made in any other suitable way. The parts $a^3$ extend upward from the pivots $a^4$ above the level of the working face of the pedal 2 when the parts are in their idle or unoccupied position, free from the foot of the rider, as shown in Fig. 1. The part $a'$ is curved upward and inward in respect to the parts $a$ and $a^2$, so that when the rider applies his foot in proper position to the pedal his weight operating on the lever-arms $a^2$ of the clip will turn the same on its pivotal bearings $a^4$, so as to cause the part $a'$ to turn inward over the foot of the rider and engage the same, as shown in Fig. 3. The weight of the clip is so distributed in respect to its pivotal bearings $a^4$ and the bearings for the pedal that under the action of a suitable spring or springs $a^5$ the clip will always assume a position wherein the center of gravity will be eccentric to the axis of the pedal and on the side of the same opposite to the working surface or foot-face of the pedal. In virtue of this construction the pedal and the clip will, when free from the rider's foot, always assume the horizontal position regardless of the position which may be occupied by the crank-arm at the time. Otherwise stated, the construction is such that the pedal is always in proper position for receiving the rider's foot. That the weight of the clip will have this effect to balance or right the pedal when free from the rider's foot and below the pedal is obvious from an inspection of Fig. 1, because the weight of the clip is obviously below the clip-pivots $a^4$; but if the foot should be removed when the parts are in the position shown in Fig. 3, the springs $a^5$ would instantly throw the clip into the same position in respect to the pedal as shown in Fig. 1, and if the pedal should chance to have been turned wrong side up by the rider the eccentric position assumed by the clip under the action of its spring or springs $a^5$ would make the whole mass top-heavy, so as to require the same to turn into the position shown in Fig. 1. The pedal and clip will therefore always come right side up. This is an important improvement which all experienced riders will appreciate.

The ordinary toe-clip, as ordinarily applied, causes the pedal to assume a vertical position. Hence the rider is put to considerable inconvenience in order to properly position the pedal to catch the clip when mounting the wheel. This objection is all overcome by my device. Another important advantage of this form of clip resides in the fact that the clip takes hold of the top of the foot at a point near the instep, so as to render much better leverage available for pulling up on the pedals when going downhill. This is a very great improvement for use on wheels which do not employ a brake.

By actual usage I have demonstrated the efficiency of the device herein disclosed for the purposes had in view, and all the statements of fact herein made are based upon the action of the said working device.

The sidewise engagement is no disadvantage, from the fact that the foot may be freed from the clip just as readily as from the ordinary form. On the other hand, this form of clip affords a much firmer grip on the foot and is more reliable in every way. It is also of such shape and in such a position as to interfere much less with clothing when the rider is afoot and moving his wheel.

The springs $a^5$ are shown as applied to the pivots $a^4$ at one end and to the clip-levers $a^2$ at the other; but it will be understood, of course, that any form of spring might be applied in any way which would throw the clip eccentric to the pedal opposite the working side when free from the rider's foot. The cross-bar $a^3$ of the clip is shown as provided with an inward extension or finger $a^6$, which serves as a stop to limit the eccentric movement of the clip in respect to the pedal, under the action of the springs $a^5$, by engagement with the pedal, as shown in Figs. 1 and 2.

It will be understood, of course, that I do not limit myself to the special form of construction herein shown. The principle involved is capable of quite a wide range of modification.

It will be understood, of course, that various alterations in the details of construction above set forth may be made without departing from the spirit of my invention.

What I claim, and desire to secure by Letters Patent of the United States, is as follows:

1. The combination with a crank and pedal, of a clip pivoted to said pedal, transversely of the pedal's axis, with its center of gravity on one side of its own pivot and substantially in a vertical plane passing through the axis of said pedal which clip is provided, at its light end, with a part normally projecting above the working face of the pedal, and, at its heavy end, with a shoe or foot clamping portion, whereby, when out of use, said clip will throw and hold said pedal right side up, and when stepped upon, will engage the rider's foot, substantially as described.

2. The combination with a crank and pedal, of a clip pivoted to said pedal, transversely of the pedal's axis, with its center of gravity on one side of its own pivot and substantially in a vertical plane passing through the axis of said pedal which clip is provided, at its light end, with a part normally projecting above the working face of the pedal, and, at its heavy end, with a shoe or foot clamping portion, and a spring tending to throw said clip into its normal position, whereby, when out of use, said clip will throw and hold said pedal right side up, and when stepped upon, will engage the rider's foot, substantially as described.

3. The combination with a crank and pedal, of a clip pivoted to said pedal, transversely of the pedal's axis, with its center of gravity on one side of its own pivot and substantially in a vertical plane passing through the axis of said pedal, the light end of which clip normally projects above the working face of the pedal, and the heavy end of which clip is curved upward and inward and is adapted to transversely engage the top of the rider's foot; whereby, when out of use, said clip will throw and hold said pedal right side up, and when stepped upon, will engage the rider's foot, substantially as described.

In testimony whereof I affix my signature in presence of two witnesses.

ALFRED L. BRICE.

Witnesses:
 JAS. F. WILLIAMSON,
 BESSIE B. NELSON.